US010772339B2

(12) United States Patent
Tobin et al.

(10) Patent No.: US 10,772,339 B2
(45) Date of Patent: Sep. 15, 2020

(54) PROCESS FOR THE HUMANIZATION OF ANIMAL SKIM MILK AND PRODUCTS OBTAINED THEREBY

(75) Inventors: John Tobin, Mitchelstown (IE); Philip Kelly, Mitchelstown (IE); Rudolph Eduardus Maria Verdurmen, Utrecht (NL); Antonie Van Baalen, Utrecht (NL); Roeland Van Eerten, Utrecht (NL)

(73) Assignee: N.V. NUTRICIA, Zoetermeer (NL)

( * ) Notice: Subject to any disclaimer, the term of this patent is extended or adjusted under 35 U.S.C. 154(b) by 570 days.

(21) Appl. No.: 14/384,654

(22) PCT Filed: Mar. 12, 2012

(86) PCT No.: PCT/NL2012/050148
§ 371 (c)(1),
(2), (4) Date: Nov. 10, 2014

(87) PCT Pub. No.: WO2013/137714
PCT Pub. Date: Sep. 19, 2013

(65) Prior Publication Data
US 2015/0093490 A1    Apr. 2, 2015

(51) Int. Cl.
*A23C 9/142* (2006.01)
*A23C 9/152* (2006.01)
*A23J 1/20* (2006.01)
*A23L 33/19* (2016.01)
*A23C 9/15* (2006.01)
*A23L 33/00* (2016.01)
*A23C 1/04* (2006.01)

(52) U.S. Cl.
CPC .......... *A23C 9/1422* (2013.01); *A23C 1/04* (2013.01); *A23C 9/1512* (2013.01); *A23J 1/20* (2013.01); *A23L 33/19* (2016.08); *A23L 33/40* (2016.08); *A23C 2210/206* (2013.01); *A23V 2002/00* (2013.01); *A23V 2250/54252* (2013.01); *A23V 2300/34* (2013.01)

(58) Field of Classification Search
CPC ..... A23C 9/1422; A23C 9/1512; A23L 33/40; A23L 33/19; A23J 1/20
USPC ................................ 426/580, 587
See application file for complete search history.

(56) References Cited

U.S. PATENT DOCUMENTS

| 5,169,666 | A |   | 12/1992 | Woychik |           |
|-----------|---|---|---------|---------|-----------|
| 5,503,865 | A |   | 4/1996  | Behringer et al. | |
| 5,670,196 | A | * | 9/1997  | Gregory ............... | A23C 9/1425 |
|           |   |   |         |         | 426/422   |
| 6,485,762 | B1|   | 11/2002 | Rizvi et al. | |

| 2006/0172058 | A1 |   | 8/2006 | Achs |            |
|--------------|----|---|--------|------|------------|
| 2007/0166447 | A1 | * | 7/2007 | Ur-Rehman ......... | A23C 9/1206 |
|              |    |   |        |      | 426/580    |
| 2009/0017176 | A1 |   | 1/2009 | Sugawara et al. | |
| 2011/0097442 | A1 |   | 4/2011 | Harju et al. | |
| 2013/0064923 | A1 |   | 3/2013 | Remondetto et al. | |
| 2015/0093490 | A1 |   | 4/2015 | Tobin et al. | |

FOREIGN PATENT DOCUMENTS

| EP | 1 133 238       |    | 9/2001  |              |
|----|-----------------|----|---------|--------------|
| EP | 2 839 749       | A1 | 2/2015  |              |
| FR | 2631785         | A1 | 12/1989 |              |
| NL | 2006662         |    | 10/2012 |              |
| NZ | 511562          | A * | 10/2003 | ............. A23C 9/142 |
| WO | WO-94/06306     |    | 3/1994  |              |
| WO | WO-96/08155     | A1 | 3/1996  |              |
| WO | WO-00/30461     | A1 | 6/2000  |              |
| WO | WO-2008/127104  |    | 10/2008 |              |
| WO | WO-2009/059266  | A1 | 5/2009  |              |
| WO | WO-2009/072884  | A1 | 6/2009  |              |
| WO | WO-2009/113845  | A1 | 9/2009  |              |
| WO | WO-2011/051557  | A1 | 5/2011  |              |
| WO | WO-2011/115498  | A1 | 9/2011  |              |
| WO | WO-2013/068653  | A2 | 5/2013  |              |
| WO | WO-2013/137714  | A1 | 9/2013  |              |

OTHER PUBLICATIONS

International Search Report issued in International Patent Application No. PCT/NL2014/050643, dated Apr. 15, 2015.
International Search Report of PCT/NL2012/050148 dated Dec. 5, 2012.
Baldasso et al., "Concentration and purification of why proteins by ultrafiltration", Desalinization, vol. 278, 2011, pp. 381-386 (6 pages).
Govindasamy-Lucey et al., "Use of Cold Microfiltration Retentates Produced with Polymeric Membranes for Standardization of Milks for Manufacture of Pizza Cheese", Journal of Dairy Science, vol. 90, 2007, pp. 4552-4568 (17 pages).
International Preliminary Report on Patentability, Ch. I, for PCT/NL2012/050148 dated Sep. 16, 2014 (7 pages).
Pouliot, Yves, "Membrane processes in dairy technology—From a simple idea to worldwide panacea", International Dairy Journal, vol. 18, 2008, pp. 735-740 (6 pages).

\* cited by examiner

*Primary Examiner* — Jeffrey P Mornhinweg
(74) *Attorney, Agent, or Firm* — Foley & Lardner LLP

(57) ABSTRACT

The invention relates to a process for the treatment of animal skim milk and for the production of an infant formula base product from animal skim milk, which process is highly efficient and cost effective, as only membrane filtration techniques, such as microfiltration and ultrafiltration, are required. By carefully controlling the process parameters, a product is obtained in which most of the major components are within the desired range for an infant formula base product. The invention also relates to products obtainable by the process according to the invention.

17 Claims, No Drawings

PROCESS FOR THE HUMANIZATION OF ANIMAL SKIM MILK AND PRODUCTS OBTAINED THEREBY

CROSS REFERENCE TO RELATED APPLICATIONS

The present application is a National Stage of International Application No. PCT/NL2012/050148 filed on Mar. 12, 2012, the entire disclosure of which is incorporated herein by reference.

FIELD OF THE INVENTION

The invention relates to the treatment of animal skim milk, which is ideally suited for the preparation of an infant formula or infant formula base product.

BACKGROUND OF THE INVENTION

Human milk is considered the 'golden standard' for infant nutrition. Processing animal milk, for example cow's milk, to more resemble the composition of human milk is known in the art. Such processing is known in the art as 'humanizing' animal milk.

The process of humanizing animal milk involves changing the ratio of casein/whey proteins from approximately 80/20 to approximately 40/60, which is the ratio found in human milk.

WO 2011/051557 describes a process for increasing the casein content of whey protein isolate for the preparation of a palatable beverage for athletes and other exercise enthusiasts, comprising the steps of subjecting skim milk to microfiltration (MF) and ultrafiltration (UF).

WO 96/08155 describes a process for treating skim milk for the manufacture of cheese and milk powders, wherein whey proteins are removed from skim milk by microfiltration and ultrafiltration. Volume concentration factors of 20-100 are employed in the UF step. No recombination of the MF retentate and UF permeate is described for the preparation of infant formulae and no attention is given to the concentration of minerals and trace elements such as phosphorus.

U.S. Pat. No. 5,503,865 discloses a process for treating skim milk, comprising microfiltration or ultrafiltration, the permeate of which needs to be demineralised by for example ion exchange and/or electrodialysis in order to make the skim milk product suitable to be used in infant formulae.

WO 2008/127104 discloses the production of whey protein serum comprising residual beta casein by subjecting cow's milk to microfiltration over a membrane with a pore size of 0.3-0.5 micrometer at a temperature between 10 and 20° C., optionally with a further concentration step via ultrafiltration. No specific steps are described to prepare infant formulae.

The process of U.S. Pat. No. 5,169,666 uses even lower temperatures (4° C.) at which the microfiltration over membranes with a pore size of 0.1-0.2 micrometer is performed. At this temperature beta casein dissociates from the casein micelles and ends up in the MF permeate. Apart from being undesirably high in casein, the MF permeate is also too high in ash to be suitable for use in infant formulae. No measures are described to further reduce the ash content.

EP 1133238 describes a process wherein animal milk is subjected to microfiltration through a membrane having a porosity of 0.1-0.2 micrometer, after which the MF permeate is demineralised by electrodialysis. The mineral content of the electrodialyzed MF permeate is very low, and subsequent fortification with minerals and trace elements is required to obtain an infant formula.

SUMMARY OF THE INVENTION

The inventors have found that animal skim milk can be humanized by an efficient and cheap process, requiring minimal processing steps and enabling maximal use of the ingredients in animal skim milk. The term "minimal processing steps" is to be understood as not requiring expensive demineralisation steps as discussed below, such as ion exchange or electrodialysis. The process according to the invention modifies the amounts (weight ratio) in which the various ingredients, such as casein, whey proteins and minerals, are present in animal skim milk to closely resemble the amounts of these ingredients in human milk. According to the present invention, this is possible using minimal processing steps, since just enough of each ingredient is removed from and/or concentrated in the animal skim milk, in order to arrive at the desired content of that particular ingredient. As such, minimal supplementation of these ingredients is needed, to bring the content of the different ingredients in the desired and/or prescribed range. The present process especially reduces the extent of mineral supplementation. The present process for humanizing animal skim milk is ideally suited for the preparation of an infant formula or an infant formula base product. Particularly advantageous is the lack of a dry intermediate protein product in the process. Normally, in the manufacture of infant milk formula, dry intermediate products are used. The present process preferably prevents the need of using dry protein products.

Furthermore, the process according to the invention provides a composition, in which the protein and mineral content is within desired and/or prescribed ranges, without the need for extensive supplementation or fortification after demineralization. Thus, the present process provides a means to remove 'just enough' minerals to arrive at the desired amounts for infant nutrition. Surprisingly, this can be achieved using relatively simple procedures.

According to the present invention, in order to achieve a change in casein/whey ratio, animal milk is fractionated by microfiltration (MF) into a casein stream (MF retentate) and a whey stream (MF permeate). This microfiltration step is efficient using a pore size of 0.10-0.35 micrometer. The animal milk is skimmed prior to MF, in order to prevent clogging of the microfiltration membrane by fat particles.

In general, the mineral content of human milk is different to that of animal milk. Therefore, in addition to altering the casein/whey protein weight ratio, it is of importance that the mineral content of the animal milk is altered, such that the mineral content of human milk is resembled. In the art, the whey stream is normally demineralised to remove substantially all minerals from the animal skim milk. Such a demineralisation step, in general, uses elaborate procedures such as ion exchange or electrodialysis, in order to ensure that the mineral content of the final infant formulae is not too high. In addition, normally extensive filtration procedures are employed, requiring multiple dilution and concentration steps, such as diafiltration. Especially problematic is the removal of divalent ions, especially phosphorus anions such as phosphate, as they remain in high concentration in the whey protein stream, even after nanofiltration. In view hereof, the mineral content is often not reduced to sufficiently low amounts by filtration alone, and thus a combination of a filtration technique and ion exchange or electrodialysis is necessary. As a result of the extensive demineralization, the mineral content of the final product of mixing the demineralised whey protein product with a casein source has to be increased again by supplementation or fortification with the essential minerals.

However, as presently found, the treatment of animal skim milk according to the invention does not require elaborate demineralization steps. Instead, it comprises the following (optional and essential) steps:
(a) optionally a first microfiltration step (MF1) over a membrane, preferably having a porosity of 1.0-2.0 micrometer, resulting in a retentate (MFR1) comprising of bacterial contamination and a permeate comprising of casein and whey (MFP1).
(b) a second microfiltration step (MF2) of heat treated animal skim milk or a liquid composition originating from the MFP1 over a ceramic membrane, preferably having a porosity of 0.10-0.30 micrometer, or a spiral wound organic membrane, preferably having a porosity of 0.10-0.35 micrometer. The MFP1 step preferably operates with a volume concentration factor of 4-8, and results in a retentate (MFR2) comprising casein and a permeate (MFP2) comprising whey proteins. Preferably, the retentate (MFR2) comprises at most 15 wt % whey protein based on total protein and at least 55 wt % casein based on dry weight of the MFR2, and the permeate (MFP2) comprises at most 1.0 wt % casein based on total dry weight of the MFP2.
(c) an ultrafiltration step (UF) of a liquid composition originating from the MFP2 over a membrane, preferably having a molecular weight cut-off of at most 25 kDa. The UF step preferably operates with a volume concentration factor of 3-7, and results in a retentate (UFR) comprising whey proteins and a permeate (UFP) comprising lactose and minerals. Preferably, the retentate (UFR) comprises 22-33 wt % whey proteins based on total dry weight and has a phosphorus/protein weight ratio between 1/40 and 1/100.
(d) optionally a nanofiltration step (NF) of a liquid composition originating from the UFR over a membrane, preferably having a molecular weight cut-off of at most 500 Da, resulting in a retentate (NFR) comprising whey proteins and a permeate (NFP).
(e) optionally mixing a composition originating from the MFR2 and a composition originating from the UFR or a composition originating from the NFR, whereby a composition having a casein/whey protein weight ratio of 30/70-50/50, preferably about 40/60 is obtained.
(f) optionally supplementing one or more from lactose, calcium and fat.
(g) optionally evaporating and/or spray-drying the mixture to a powder.

Herein, steps (e), (f) and (g) can be performed in random order.

The process according to the invention does not require costly demineralization steps such as ion exchange and/or electrodialysis. Furthermore, none of the steps require dilution, i.e. the addition of fluids, which effectively reduces the costs of drying the final product.

An additional advantage of the process according to the present invention is the fact that no heat treatments are required before mixing the whey and casein streams in the final step. Thus, in one embodiment, the animal skim milk is not heated to a temperature above 75° C., preferably not above 70° C., more preferably not above 60° C. Preferably, the animal skim milk and the whey and casein streams do not exceed these temperatures before they are combined in the final step.

In one embodiment, the present invention relates to a process for the preparation of an infant formula base product, comprising:
(a) a microfiltration step (MF2) of animal skim milk over a ceramic membrane having a porosity of 0.10-0.30 micrometer or over a spiral wound organic membrane having a porosity of 0.10-0.35 micrometer and operating with a volume concentration factor of 4-8, resulting in a retentate (MFR2) and a permeate (MFP2);
(b) an ultrafiltration step (UF) of a liquid composition originating from the MFP2 over a membrane having a molecular weight cut-off of at most 25 kDa and operating with a volume concentration factor of 3-7, resulting in a retentate (UFR) and a permeate (UFP);
(c) mixing a composition originating from the MFR2 and a composition originating from the UFR, whereby a composition having a casein/whey weight ratio of 30/70-50/50 is obtained.

In one embodiment, the present invention relates to a process for the preparation of an infant formula base product, comprising:
(a) a microfiltration step (MF2) of animal skim milk over a ceramic membrane having a porosity of 0.10-0.30 micrometer or over a spiral wound organic membrane having a porosity of 0.10-0.35 micrometer, resulting in a retentate (MFR2) comprising at most 15 wt % whey protein based on total protein and at least 55 wt % casein based on dry weight of the MFR2, and a permeate (MFP2) comprising at most 1.0 wt % casein based on total dry weight of the MFP2;
(b) an ultrafiltration step (UF) of a liquid composition originating from the MFP2 over a membrane having a molecular weight cut-off of at most 25 kDa, resulting in a retentate (UFR) comprising 22-33 wt % whey proteins based on total dry weight and a phosphorus/protein weight ratio between 1/40 and 1/100, and a permeate (UFP);
(c) mixing a composition originating from the MFR2 and a composition originating from the UFR, whereby a composition having a casein/whey weight ratio of 30/70-50/50 is obtained.

In one embodiment, the present invention relates to a process for the preparation of an infant formula base product, comprising:
(a) a microfiltration step (MF2) of animal skim milk over a ceramic membrane having a porosity of 0.10-0.30 micrometer or over a spiral wound organic membrane having a porosity of 0.10-0.35 micrometer and operating with a volume concentration factor of 4-8, resulting in a retentate (MFR2) comprising at most 15 wt % whey protein based on total protein and at least 55 wt % casein based on dry weight of the MFR2, and a permeate (MFP2) comprising at most 1.0 wt % casein based on total dry weight of the MFP2;
(b) an ultrafiltration step (UF) of a liquid composition originating from the MFP2 over a membrane having a molecular weight cut-off of at most 25 kDa and operating with a volume concentration factor of 3-7, resulting in a retentate (UFR) comprising 22-33 wt % whey proteins based on total dry weight and a phosphorus/protein weight ratio between 1/40 and 1/100, and a permeate (UFP);
(c) mixing a composition originating from the MFR2 and a composition originating from the UFR, whereby a composition having a casein/whey weight ratio of 30/70-50/50 is obtained.

In one embodiment, the present invention relates to a process for the preparation of an infant formula base product, comprising mixing a composition, comprising at most 1 wt % casein and 22-33 wt % whey proteins, based on total dry weight of the composition, and having a phosphorus/protein weight ratio between 1/40 and 1/100, with a casein source.

The present invention also relates to products obtainable by the processes according to the invention. In one embodiment, the present invention relates to a composition, comprising at most 1 wt % casein and 22-33 wt % whey proteins, based on total dry weight of the composition, and having a phosphorus/protein weight ratio between 1/40 and 1/100.

In one embodiment, the present invention relates to an infant formula base product obtainable by any of the processes according to the invention.

DETAILED DESCRIPTION OF THE INVENTION

The starting material for the present process is animal skim milk, preferably bovine skim milk. Although it may be common practice to apply a pasteurization or sterilization step when processing animal milk, heat treatment of protein compositions has the disadvantage that at least part of the proteins denatures, which makes filtration steps less efficient. Denatured whey proteins bind to casein micelles, which, upon microfiltration, results in an undesirable increase in whey protein content of the MF retentate. Thus, in a preferred embodiment, the skim milk is not heat treated above a temperature of 75° C., more preferably not above 70° C., most preferably not above 60° C., prior to entering the process according to the invention.

MF1

The microfiltration step 1 (MF1) is employed to remove bacterial contamination of non-heat treated animal skim milk. Non-heat treated animal skim milk has not experienced a temperature above 75° C., more preferably not above 70° C., most preferably not above 60° C. When this step would be skipped, bacterial contamination may concentrate into the casein stream (MFR2) after the MF2 step. Obviously, when bacteria are removed by heat treatment of the animal skim milk before it is entered in the process according to the invention, the MF1 step is not required. As it is one of the objects of the present invention is to provide a process wherein no heat treatment is necessary before the final mixing step, it is preferred that incoming skim milk of the MF2 step has not received a heat treatment step but a MF1 step instead, in other words the incoming skim milk of the MF2 step has not experienced a temperature above a temperature of 75° C., more preferably not above 70° C., most preferably not above 60° C. Thus, according to a preferred embodiment, the MF1 step is incorporated in the process according to the invention.

Bacterial removal via microfiltration is preferably performed over a membrane having a pore size of 1.0-2.0 micrometer. Suitable membranes may be ceramic or spiral wound membranes. Typically, a ceramic membrane having a pore size of about 1.4 micrometer is used. The MF1 step is preferably performed below 75° C., more preferably between 10° C. and 70° C., even more preferably between 25° C. and 65° C., most preferably between 40° C. and 60° C. The MF1 step preferably operates at a volume concentration factor of 5-20, more preferably 8-15, more preferably 9-12. As additional advantageous effect, the fat content of skim milk (typically 0.1-0.3 wt %, based on the total weight of skim milk) is further reduced, which facilitates the further filtration steps, as clogging by fat particles is reduced. Furthermore, compared to pasteurization, which occurs at temperatures above 75° C., the MF1 step ensures that the whey proteins present in the skim milk remain in their native state. As a result thereof, the whey proteins do not complex with either themselves or the casein micelles, thus optimizing the levels of whey proteins available for membrane permeation in the subsequent MF2 step.

The retentate of the MF1 step (MFR1) comprises bacterial contamination and the permeate of the MF1 step (MFP1) comprises all beneficial ingredients of skim milk, such as casein, whey proteins, lactose and minerals.

The current invention does not exclude the use of heat treated animal skim milk, which has not undergone the MF1 step. The heat treated animal skim milk or the permeate of the MF1 step (MFP1), is then led to the second microfiltration (MF2) step.

MF2

In the microfiltration step 2 (MF2), skim milk is fractioned into two distinct streams, each enriched in a particular protein type; a casein enriched retentate and a whey protein enriched permeate are produced. This fractionation of protein types causes concomitant modifications to both streams in terms of macronutritional composition and mineral distribution.

The incoming stream of the MF2 step, which is either heat treated animal skim milk or a liquid composition originating from MFP1, has a low fat content, preferably of below 0.5 wt %, preferably below 0.2 wt %, more preferably below 0.1 wt % based on the total weight of the incoming stream. Because of this low fat content, the microfiltration membrane in the MF2 step is not fouled rapidly.

The MF2 step is performed over a ceramic membrane, preferably having a porosity of 0.10-0.30 micrometer, or a spiral wound organic membrane, preferably having a porosity of 0.10-0.35 micrometer. The MF2 step preferably operates with a volume concentration factor (VCF) of 4-8, preferably 5-7, most preferably 5.5-6.5. The MF2 step is preferably performed below 75° C., more preferably between 10° C. and 70° C., even more preferably between 25° C. and 70° C., most preferably between 40° C. and 60° C.

When such a pore size and VCF is employed, the retentate MFR2 comprises very little whey protein, preferably less then 15 wt % based on the total weight of the protein, and is high in casein content, preferably at least 55 wt %, more preferably 60-65 wt %, most preferably 59-61 wt % casein based on dry weight of the MFR2. The content of total solids in the MFR2 stream is preferably at least 20 wt % based on total weight of the MFR2 stream. Such high levels of casein in the MFR2 stream are readily achievable using a VCF of at least 4, which is advantageous for balancing of protein/mineral ratios in the final product. It is particularly advantageous that the animal skim milk has not received any heat treatment above 75° C., preferably not above 70° C., most preferably not above 60° C., as such heat treatment results in significant denaturation of the whey proteins, which impairs the partitioning of the casein and whey proteins in the MF2 step. Denaturated whey proteins tend to aggregate with the casein micelles, and thus the MFR2 may then comprise a large amount of whey.

Some residual whey protein is always present in the MFR2 stream, first and foremost since not all the liquid comprising whey protein is pushed through the microfilter. Depending on the exact constitution of the skim milk and the nature of the pre-treatment (e.g. heat treatment or MF1), the amount of whey protein in the MFR2 stream may vary. The whey protein content may be further lowered by diafiltration, if necessary. However, diafiltration requires a lot of additional water and is not preferred. Preferably, the VCF is carefully chosen to obtain a MFR2 having a whey protein content below 15 wt % based on the weight of the total protein.

Preferably the permeate of the MF2 step (MFP2) contains very little casein, in particular at most 1.0 wt % casein based on total dry weight of MFP2, preferably at most 0.5 wt % casein based on total dry weight. As divalent ions are problematic to be removed by further filtration steps, it is desirable that the content of divalent ions in MFP2 is sufficiently low. Again, it has been found that carefully controlling the VCF results in beneficial content of whey and divalent ions in the MFP2 stream. In this respect, it is preferred that the whey content of the MFP2 is at least 95 wt %, more preferably at least 98 wt %, more preferably at least 99 wt %, most preferably at least 99.5 wt %, based on the total weight of the protein in MFP2. Based on total dry weight of the MFP2, the whey protein content is preferably at least 5 wt %, more preferably 6-20 wt %, most preferably 7-15 wt %. The phosphorus/protein weight ratio is preferably at most 1/12. Phosphorus and calcium are especially retained in the retentate, because they are associated with micellar casein. Conversely, high levels of monovalent ions (Na, K, Cl) are permeated into the MFP2 stream. These monovalent ions are easily removed via ultrafiltration and optionally nanofiltration during a later stage of the process according to the invention.

In a preferred embodiment, the volume concentration factor is carefully selected to produce an MFR2 stream with the characteristics as described above, i.e. comprising at most 15 wt % whey protein based on total protein and at least 55 wt % casein based on dry weight of the MFR2, and a MFP2 stream with the characteristics as described above, i.e. comprising at most 1.0 wt % casein at preferably at least 5 wt % whey protein, based on total dry weight of the MFP2, and a phosphorus/protein weight ratio preferably at most 1/12.

Thus, it has been found that keeping the VCF of the MF2 step within the required range yields both an optimally constituted casein enriched MFR2 stream and an optimally constituted whey protein enriched MFP2 stream, which facilitates the manufacture of an infant formula base product with minimal process steps.

Purely as a theoretical exercise, if the casein enriched MFR2 stream and whey protein enriched MFP2 stream were blended together without further modification in the appropriate ratio to give an infant formula base product, i.e. with the correct protein content and the correct casein/whey protein weight ratio of approximately 40/60, a number of compositional issues arise. Firstly the lactose content is now above target, as well as all of the major mineral components. In particular the monovalent ions Na, K, Cl levels are several folds higher than the maximally allowed levels for infant formula base products.

In line with the invention, removal of monovalent ions via a combination of nanofiltration and diafiltration would be undesirable, as large volumes of reverse osmosis water would be needed to successfully lower the monovalent ions content from such a high initial level, drastically increasing processing time and costs. More importantly, the divalent ions (Ca, Mg, P) have very high rejection levels during NF and therefore they remain in the retentate comprising whey proteins. Thus, blending of a NF/DF retentate with the casein enriched MFR2 in a protein balanced infant formula base product, Mg and P would remain greatly outside the maximal levels.

Analogously, demineralization with electrodialysis or ion exchange would reduced the mineral to undesirably low values. In addition, these are inefficient and costly procedures. It is now found that subjecting the MFP2 to UF efficiently and cost effective reduces the mineral content of the whey stream to the desired amounts.

UF

According to the invention, a liquid composition originating from the MFP2 is fed to an ultrafiltration (UF) step, wherein most of the liquid and small solutes end up in the UF permeate (UFP), while the UF retentate (UFR) comprises all or almost all whey protein, in a smaller volume. Small molecules which permeate through the UF membrane are for example lactose, monovalent and divalent ions.

The incoming stream of the UF step is a liquid composition originating from the MFP2, preferably comprising at most 1 wt % casein based on total dry weight and a phosphorus/protein weight ratio of at most 1/12. The UF step preferably employs a membrane having a molecular weight cut-off of at most 25 kDa, more preferably at most 10 kDa, and preferably of at least 2.5 kDa, more preferably at least 5 kDa, and operates with a volume concentration factor of 3-7, preferably 4-6. The UF step is preferably performed below 40° C., more preferably between 3° C. and 30° C., even more preferably between 5° C. and 20° C.

Using such processing parameters, the UF retentate (UFR) stream typically comprises 22-33 wt %, preferably 22-30 wt % whey proteins based on total dry weight of UFR and typically has a phosphorus/protein weight ratio between 1/40 and 1/100, preferably between 1/45 and 1/75, more preferably between 1/50 and 1/60. The volume concentration factor determines how much of the minerals and lactose permeate through the membrane, which is important for the content of the different ingredients in the final product. The VCF also determines how much liquid is not pushed through the UF membrane and remains in the retentate. This retentate liquid still comprises the small solutes, which are also permeated together with the liquid which is pushed through the membrane. Thus, high VCF values lead to increased whey protein concentration in the UFR stream and lower values for the phosphorus/protein weight ratio, while low VCF values give rise to lower levels of whey protein in the UFR stream and an increased phosphorus/protein weight ratio. A phosphorus/protein weight ratio of 1/40 preferably is not exceeded, as this would lead to a final product having too high a phosphorus content. In addition, if the phosphorus/protein weight ratio is lower than 1/100, additional phosphates may need to be supplemented to the final product. Thus, the phosphorus/protein weight ratio of the UFR stream is preferably between 1/40 and 1/100.

In a preferred embodiment, the volume concentration factor is carefully selected to produce a UFR stream with the characteristics as described above, i.e. comprising 22-33 wt %, preferably 22-30 wt % whey proteins based on total dry weight and a phosphorus/protein weight ratio of 1/40-1/100, preferably 1/45-1/75, more preferably 1/50-1/60.

A UFR having these characteristics is especially suitable to be combined with the MFR2, as this combination renders a composition, having the majority of the ingredients in the desired range for an infant formula base product.

The UFP stream is rich in lactose, which is a valuable product for multiple purposes, for example it can optionally be reintroduced into the process at a later stage in a demineralised form. Demineralization of lactose is efficiently performed by crystallisation of the lactose from the UFP stream, in which process all minerals remain in solution.

NF

Optionally, a liquid composition originating from the UFR may be further concentrated by a nanofiltration (NF)

step, which employs a membrane having a small pore size. Only water and monovalent ions pass through this membrane, resulting in a concentration of the whey stream, which makes the process more cost-effective, for example by reducing the evaporation and mixing costs in the final steps. Using NF, large amounts of water can be removed by cost-effective membrane filtration techniques. For example, employing a VCF of 4 results in the removal of 75% of the water. In addition, further reduction of the monovalent ion content of a liquid composition originating from the UFR stream may be necessary, depending on the nature and exact constitution of the incoming skim milk. Thus, the incoming liquid composition originating from the UFR stream may still be a little high in sodium and potassium ion content, and thus the composition of the final product may benefit from the additional NF step. However, favourable results have also been obtained when no NF step is executed.

The NF step typically employs a membrane, such as a spiral wound membrane, having a molecular weight cut-off of at most 500 Da, preferably at most 300 Da, and of at least 100 Da, preferably at least 150 Da, and typically operates with a volume concentration factor of 2-10, preferably 3-5. The NF step is preferably performed below 40° C., more preferably between 3° C. and 30° C., even more preferably between 5° C. and 20° C.

The NF retentate (NFR) stream is further concentrated in whey protein and is somewhat reduced in monovalent ion content, with respect to the liquid composition originating from the UFR stream. The NF permeate (NFP) comprises mainly water and monovalent ions.

Preferably, the UF and NF steps of the process according to the invention are, each individually, performed without enhancement by diafiltration. Diafiltration requires the addition of fluids, such as demineralised water, which lowers the efficiency of the present process.

Mixing

A composition originating from the UFR stream or optionally a composition originating from the NFR stream are ideal compositions for recombination with a portion of a composition originating from the MFR2 stream to produce an infant formula base product with the correct protein content and the correct casein/whey protein weight ratio. In this respect, it is to be understood that whenever the UFR stream, the NFR stream and/or the MFR2 steam, each individually, undergoes an additional processing step prior to the mixing step, they are still considered as being a composition originating from UFR stream, NFR stream and/or MFR2 steam, respectively, in the context of the present invention. The amounts of the composition originating from the UFR or the composition originating from the NFR and the composition originating from the MFR2, which are subjected to mixing, are selected as such, to arrive at a final product having a casein/whey protein weight ratio of between 30/70 and 50/50, preferably between 35/65 and 45/55, most preferably about 40/60.

Mixing of the composition originating from the MFR2 stream with the composition originating from the UFR stream, or optionally with the composition originating from the NFR stream, can be performed as wet mixing, wherein the liquid compositions are mixed in the appropriate amounts. These liquid compositions may undergo further treatment prior to mixing, such as partial evaporation of the solvent. Preferably, after mixing, the liquid composition is dried to a powder. In another embodiment, the casein stream and the whey protein stream are dry mixed, wherein each stream individually is dried prior to mixing. Drying of a liquid composition, either after or prior to mixing, is preferably done by spray-drying the composition to a powder, optionally preceded by partial evaporation of liquid.

In an especially preferred embodiment of the present invention, the mixing is performed using liquid streams in the appropriate amounts (wet mixing), after which the mixture is dried, preferably spray-dried. Herein, only one drying step is needed in the manufacture of an infant formula base powder. Normally, more drying steps are needed, such as drying of a casein containing composition and drying of a whey protein containing composition. Drying, such as spray-drying, is a costly procedure, which is typically performed at high temperatures, such as above 150° C. or even above 180° C. Reducing the amount of spray-drying steps to one greatly improves the efficiency of the process. Again, additional process steps such as partial evaporation may be performed prior to mixing or in between mixing and spray-drying, according to this preferred embodiment of the invention.

It is preferred that each of the composition originating from the MFR2 stream and the composition originating from the UFR stream, or optionally the composition originating from the NFR stream, comprises at least 60 wt %, preferably 70-98 wt % water, based on the total weight of the respective stream, at the time of mixing. It is to be understood that the exact amount of water of each individual stream can vary depending on the exact processing parameters employed and the constitution of the incoming skim milk. Thus, the composition originating from the MFR2 stream may preferably comprise 70-90 wt % water, more preferably 74-82 wt % water, based on the total weight of the composition originating from the MFR2 stream, and the composition originating from the UFR stream may preferably comprise 80-98 wt % water, more preferably 87-95 wt % water, based on the total weight of the composition originating from the UFR stream. When nanofiltration of the liquid composition originating from the UFR stream is employed, the composition originating from the NFR stream may preferably comprise 70-90 wt % water, more preferably 75-85 wt % water, based on the total weight of the composition originating from the NFR stream.

It is highly advantageous that upon mixing, the content of the essential components other than casein and whey protein are on or below target. When the content of a specific component is below target, it is possible to supplement this component to the final product, however when its content is above target, removal thereof can be problematic. Thus, it is an aim of the process according to the invention that the content of each of lactose, fat, ash, phosphorus, calcium, magnesium, sodium, potassium and chloride are on or below target. Preferably, the need for supplementing additional minerals is reduced with respect to known processes. Thus, it is preferred that the content of at least one of phosphorus, calcium, magnesium, sodium, potassium and chloride is on target, more preferably the content of at least two of phosphorus, calcium, magnesium, sodium, potassium and chloride are on target, even more preferably the content of at least three of phosphorus, calcium, magnesium, sodium, potassium and chloride are on target, even more preferably the content of at least four of phosphorus, calcium, magnesium, sodium, potassium and chloride are on target, most preferably the content of at least five of phosphorus, calcium, magnesium, sodium, potassium and chloride are on target. If the content of one or more minerals is below target, fortification with that particular mineral may be needed. For example, the content of calcium may be below target, so fortification with calcium may be needed. Thus, in a preferred embodiment, the final product is supplemented with any ingredient which is below target.

Thus, the amounts of ions, such as phosphorus, sodium, potassium, chlorine and magnesium are advantageously within the desired range, when the composition originating from the UFR or the composition originating from the NFR is combined with the composition originating from the MFR2 in the appropriate ratio to obtain a composition having the required casein/whey protein weight ratio. Using the process according to the invention, preferably only fortification with additional calcium is needed in the final product.

As a result of the process according to the invention, the fat content may be below target for an infant formula base product, as the process operates most efficiently when the fat content of the incoming skim milk of the composition originating from the MF2 step is minimal. Thus, the final product may be supplemented with fat, which enables the supplementation of a specifically designed fat component, which is ideally suitable for infant nutrition. Also, the lactose content of the final product may be below target. Supplementation with lactose is easily accomplished using crystallized lactose. However, other sources of lactose may also be used. Lactose may be added in a dry form, preferably crystallized, to one or both of the streams to be mixed prior to mixing. Suitable sources of lactose and/or fat are compositions comprising lactose and/or fat in the desired amounts.

Supplementation and/or fortification of particular ingredients can be either prior to, during or after mixing of the composition originating from the UFR or the composition originating from the NFR with the composition originating from the MFR2 and/or prior to, during or after a drying step. In a preferred embodiment, supplementation is performed into one or both of the streams to be mixed prior to wet mixing.

In one embodiment, the invention relates to the treatment of animal skim milk comprises the following (optional and essential) steps:
(a) mixing of a whey protein concentrate, comprising at most 1 wt %, preferably at most 0.5 wt % casein and 22-33 wt %, preferably 22-30 wt % whey proteins based on total dry weight of the whey protein concentrate and a phosphorus/protein weight ratio between 1/40 and 1/100, preferably between 1/45 and 1/75, more preferably between 1/50 and 1/60 and a casein source, whereby a composition having a casein/whey protein weight ratio of 30/70-50/50, preferably between 35/65 and 45/55, more preferably about 40/60 is obtained.
(b) optionally supplementing one or more from lactose, calcium and fat.
(c) optionally evaporating and/or spray-drying the mixture to a powder.

Herein, steps (a), (b) and (c) can be performed in random order.

It is preferred that both the whey protein concentrate and the casein source originate from animal skim milk. It is also preferred that both the whey protein concentrate and the casein source have not undergone a heat treatment above 75° C., preferably not above 70° C., most preferably not above 60° C. prior to mixing. As such, the majority of the whey proteins are in their native state, preferably at least 80% of the whey proteins are not denatured, more preferably at least 90%, even more preferably at least 95% of the whey proteins are not denatured.

The processes according to the invention are a great improvement over the prior art, as humanization of animal skim milk via such process results in a composition, in which the great majority of ingredients is very close to their content in human milk. Only the addition of fat and optionally some lactose and calcium is needed to arrive at a perfectly balanced infant formula base product. Such a perfectly balanced product is obtained by a process comprising simple and cost-efficient filtration steps, without the need for expensive demineralization steps.

Products

The invention also relates to products obtainable by the processes as described above.

A composition comprising whey proteins as obtainable by the UF step according to the invention has not been described in the art before. The process according to the present invention, for the first time, removes 'just enough' minerals during the UF step, which results in a whey protein concentrate, comprising at most 1 wt %, preferably at most 0.5 wt % casein and 22-33, preferably 22-30 wt % whey proteins based on total dry weight of the whey protein concentrate and a phosphorus/protein weight ratio between 1/40 and 1/100, preferably between 1/45 and 1/75, more preferably between 1/50 and 1/60. Such a whey protein concentrate is ideally suited for recombination with a casein containing composition, preferably a micellar casein isolate (MCI) to obtain an infant formula base product.

In a preferred embodiment, the whey protein concentrate comprises mostly whey proteins in their native state, preferably at least 80% of the whey proteins, in particular beta-lactoglobulin, are not denatured, more preferably at least 90%, even more preferably at least 95% of the whey proteins are not denatured. This high level of whey proteins, in particular beta-lactoglobulin, in their native state is achievable, as the process according to the invention does not require heat treatment.

In another embodiment, the invention relates to an infant formula base product obtainable by the process according to the invention. Such an infant formula base product can be a spray-dried powder, having a water content below 5 wt %, preferably below 3 wt %, based on the total weight of the powder. The liquid composition obtainable by wet mixing of the composition originating from the MFR2 stream with the composition originating from the UFR stream or the composition originating from the NFR stream, without having undergone a drying step, may also be considered a infant formula base product. Such an infant formula base product is distinguishable from the prior art infant formula base products for comprising whey proteins, which are mostly in their native state, preferably at least 80% of the whey proteins are not denatured, more preferably at least 90%, even more preferably at least 95% of the beta-lactoglobulin is not denatured.

In the context of the present invention, the "native state" of proteins is to be understood as being not denaturated, i.e. the tertiary structure of the protein is intact. The amount of beta-lactoglobulins in their native state can be determined by measuring the levels of acid soluble beta-lactoglobulin content by reverse phase high performance liquid chromatography (ISO 13875/IDF 178).

Definitions

Herein, an "infant formula base product" is a liquid or powdered composition, comprising all or almost all essential ingredients in the required amounts. Compositions wherein one or a few of the ingredients of an infant formula is present in too low amounts (i.e. is below target) is also considered an infant formula base product in the context of the present invention.

The "volume concentration factor" or "VCF" is the factor at which a liquid composition is concentrated upon filtration, i.e. the total volume of the incoming stream prior to filtration divided by the total volume of the retentate after filtration, irrespective of the total solid content. Thus, when 5 L of a liquid composition is fractioned over a microfilter into a permeate of 4 L and a retentate of 1 L, this MF process operates with a VCF of 5/1=5.

The term "on target" is meant to indicate that the content of a specific component in a composition is as such, that when an infant formula is manufactured from said composition, the content of that particular component is within the legal requirements of that component. These legal requirements for infant formulae and infant formula base products are known to the skilled person, and are obtainable from for example the EFSA and/or the FDA.

Whenever a (liquid) composition is mentioned to "originate from" a retentate or permeate of a certain process step, such as from the MFP1, from the MFR2, from the MFP2, from the UFR or from the NFR, said (liquid) composition can be the composition which is directly obtained by said process step, either as permeate or as retentate. In addition, if such a directly obtained composition undergoes one or more additional processing steps, such as partial evaporation and/or supplementation of additional water or other components, the (liquid) composition is still regarded to originate from that specific process step. Thus, if the permeate of the MF2 step would be partially evaporated prior to it is entered in the UF step, the incoming stream of the UF step is regarded to be a liquid composition originating from the MFP2.

Example

The following process is intended to exemplify, not to limit, the invention.

Methodologies

The calcium, sodium, potassium, and magnesium content was determined via atomic absorption spectrometric method (ISO 8070/IDF 119). The phosphorus content was determined via molecular absorption spectrometry (ISO 9874/IDF 42).

The protein content (N*6.38) was determined with FT001/IDF 20-3, the casein content with IDF29-1/IS017997-1:2004, the whey protein content (NCN, non-casein nitrogen*6.38) with FT003, and the non-protein nitrogen (as N) with FT419 IDF20 Part 4.

MF1

Unpasteurized raw bovine milk (Dairygold, Mitchelstown, Cork, Ireland) was subjected to centrifugal separation (skimming) at 50° C. for fat removal. The skimmed milk (600 kg) was then microfiltered using a MFS19 pilot filtration plant (Tetra Pak) equipped with membralox 1.4 μm ceramic membranes (surface area ~6.5 m²). The filtration process was carried out at 50° C., employing a volume concentration factor of ten (VCF=10) and a feed flow of 750 L/hr, which resulted in 50 kg of a MF1 retentate (MFR1) and 550 kg of a MF1 permeate (MFP1). Compositional analyses of the feed material (skim milk) and MF1 permeate and retentate streams are outlined in Table 1.

TABLE 1

Compositional analysis of feed, retentate (MFR1) and permeate (MFP1) streams after the MF1 step.

| Stream | Skim milk | MFR1 | MFP1 |
|---|---|---|---|
| TS (g/100 g) | 9.03 | 9.17 | 8.44 |
| Protein (g/100 g DM) | 37.14 | 40.98 | 37.59 |
| Casein (g/100 g DM) | 28.52 | 32.41 | 28.03 |
| NCN (g/100 g DM) | 8.64 | 8.57 | 9.53 |
| NPN (g/100 g DM) | 0.38 | 0.39 | 0.39 |
| Lactose (g/100 g DM) | 54.42 | 49.52 | 53.97 |
| Fat (g/100 g DM) | 0.64 | 1.52 | 0.48 |
| Ash (g/100 g DM) | 7.80 | 7.99 | 7.96 |
| Na (mg/g DM) | 3.57 | 3.40 | 3.67 |
| K (mg/g DM) | 19.29 | 18.47 | 19.72 |
| Cl (mg/g DM) | 9.46 | 9.14 | 9.97 |
| Ca (mg/g DM) | 13.43 | 14.72 | 13.66 |
| Mg (mg/g DM) | 1.11 | 1.13 | 1.16 |
| P (mg/g DM) | 10.11 | 10.99 | 10.25 |

TS = Total solids
DM = Dry Matter

The MFP1 stream comprised all beneficial ingredients of skim milk, but no detectable bacterial contamination. The amount of fat is reduced from 0.64 wt %, based on total dry weight, in skim milk to 0.48 wt %, based on total dry weight, in the MFP1 stream.

MF2

The MFP1 stream (300 kg) was subjected to microfiltration, using a Model F pilot filtration plant (GEA), equipped with three Isoflux ceramic MF membranes (0.14 μm, total surface area 1.5 m²) for crossflow filtration (TAMI Industries). The filtration process was carried out at 50° C., employing a volume concentration factor of six (VCF=6) and a retentate flow of 1600 L/hr, which resulted in 50 kg of a retentate enriched in micellar casein and 250 kg of a permeate enriched in whey protein. Compositional analyses of the MF permeate and retentate streams are outlined in Table 2.

TABLE 2

Compositional analysis of MF2 retentate (MFR2) and MF2 permeate (MFP2) streams after the MF2 step

| Stream | MFR2 | MFP2 |
|---|---|---|
| TS (g/100 g) | 21.81 | 5.57 |
| Protein (g/100 g DM) | 73.17 | 9.63 |
| Casein (g/100 g DM) | 63.17 | 0.00 |
| NCN (g/100 g DM) | 9.71 | 9.61 |
| NPN (g/100 g DM) | 0.20 | 0.50 |
| Lactose (g/100 g DM) | 16.14 | 82.55 |
| Fat (g/100 g DM) | 1.89 | 0.00 |
| Ash (g/100 g DM) | 8.80 | 7.81 |
| Na (mg/g DM) | 2.18 | 6.27 |
| K (mg/g DM) | 9.71 | 27.25 |
| Cl (mg/g DM) | 2.64 | 17.90 |
| Ca (mg/g DM) | 25.33 | 5.28 |
| Mg (mg/g DM) | 1.21 | 1.14 |
| P (mg/g DM) | 16.49 | 6.22 |

TS = Total solids
DM = Dry Matter

The MFR2 stream had been enriched in casein to a level of >60 wt %, based on total dry weight, and a total solids content of at least 20 wt %, based on total weight of the MFR2 stream. Lactose levels decreased to a level of ~16 wt %, based on total dry weight, mineral levels expressed as ash increased to ~8.8 wt %, based on total dry weight, and the milk fat remaining after the initial MF step is concentrated in the MFR2 stream (~2.0 wt %, based on total dry weight).

The MFP2 stream produced during MF2 was much lower in protein; ~9.6 wt %, based on total dry weight, and contains no casein. Lactose levels were very high at ~83 wt %, based on total dry weight, while the mineral content expressed as ash was lower at ~7.8 g wt %, based on total dry weight. Monovalent ions levels for Na, K, Cl were high in the permeate stream, while magnesium is retained in both streams at similar levels. The MFP2 stream comprised protein and phosphorus in a phosphorus/protein weight ratio of 1/15.5.

UF

The MFP2 stream (250 kg) was subjected to ultrafiltration (UF), using a Model F pilot filtration plant (GEA), equipped with spiral wound polymer membranes (Synder, type 3838) having a molecular weight cut off (MWCO) of 5 kDa. The UF process was carried out at 10° C., employing a volume concentration factor of five (VCF=5) and a retentate flow of 1600 L/hr, which resulted a retentate (50 kg) wherein the whey proteins were concentrated and a permeate (200 kg) comprising high levels of lactose and ash. Compositional analyses of the MF permeate and retentate streams are outlined in Table 3.

The UFR stream comprised a protein content ~26 wt %, based on total dry weight, and had a total solids content of 7.0 wt %, based on total weight of the UFR stream. Monovalent ion (Na, K, Cl) levels were reduced compared to the incoming MFP2 stream, as well as the lactose content. The UFR stream comprised protein and phosphorus in a phosphorus/protein weight ratio of 1/56.4.

The UFP stream comprised no protein at all, and was enriched in monovalent ions and lactose.

TABLE 3

Compositional analysis of UF retentate (UFR) and UF permeate (UFP) streams after the UF step.

| Stream | UFR | UFP |
|---|---|---|
| TS (g/100 g) | 7.00 | 5.00 |
| Protein (g/100 g DM) | 25.82 | 0.00 |
| Casein (g/100 g DM) | 0.00 | 0.00 |
| NCN (g/100 g DM) | 0.00 | 0.00 |
| NPN (g/100 g DM) | 0.45 | 0.57 |
| Lactose (g/100 g DM) | 67.59 | 92.47 |
| Fat (g/100 g DM) | 0.49 | 0.00 |
| Ash (g/100 g DM) | 6.1 | 6.96 |
| Na (mg/g DM) | 5.06 | 6.99 |
| K (mg/g DM) | 22.41 | 31.68 |
| Cl (mg/g DM) | 10.29 | 17.20 |
| Ca (mg/g DM) | 3.52 | 3.21 |
| Mg (mg/g DM) | 1.00 | 1.14 |
| P (mg/g DM) | 4.58 | 5.48 |

TS = Total solids
DM = Dry Matter

Mixing

After the final filtration step, the UFR stream was evaporated at 65° C. in a single effect falling film evaporator to a solids content of 60 wt %, based on total weight, allowed to crystallize overnight and then spray dried in a single stage dryer (Anhydro Lab F1) equipped with rotary atomization, at an inlet/outlet temperature of 182/83° C. respectively. The MFR2 stream comprising casein was spray dried using similar conditions at a solids content of ~22 wt %, based on total weight, No prior evaporation was required, due to the high protein content of the stream.

The powders of the UFR and MFR2 streams were recombined in an infant formula base product (10 kg batch), having a casein/whey protein weight ratio of 40/60. To achieve a macronutritional composition of a target infant formula base product, supplemental addition of lactose and a fat blend was performed. Ingredient rehydration at ~30 wt % solids content was carried out at 20° C., after which the pH was measured to be 6.85. The formulation was heat treated at 90° C. for 1 minute using a Microthermics (NC, USA) indirect tubular heat exchanger, homogenization was carried out downstream of the heating section at 65° C. using first and second stage pressures of 138 and 34 bar respectively (GEA Niro-Soavi). Formulations were cooled to 35° C. and immediately spray dried at inlet/outlet temperatures of 175/90° C. respectively. The compositional analysis of the infant formula base product produced is presented in Table 4 (IMF produced), together with target ranges of macro nutrients and minerals for infant formula base powders (IMF target).

TABLE 4

Compositional analysis of infant formula base product produced from UFR and MFR2.

| | IMF (target) | IMF (produced) |
|---|---|---|
| Protein (g/100 g DM) | 11.2-12.5 | 12.37 |
| Lactose (g/100 g DM) | 48.8-59.6 | 54.85 |
| Fat (g/100 g DM) | 27.9-30.8 | 30.22 |
| Ash (g/100 g DM) | 2.00-2.5 | 2.05 |
| Na (mg/100 g) | 120-180 | 171.92 |
| K (mg/100 g) | 470-700 | 639.59 |
| Cl (mg/100 g) | 300-450 | 334.88 |
| Ca (mg/100 g) | 340-510 | 289.10 |
| Mg (mg/100 g) | 37-55 | 39.82 |
| P (mg/100 g) | 185-280 | 250.28 |

TS = Total solids
DM = Dry Matter

CONCLUSION

It is clear that the infant formula base product produced closely matches that of the target formulation both in terms of the macronutritional and mineral content, and is within the allowable range for all constituents, except calcium which is easily added and/or fortified with.

The invention claimed is:
1. A process for the preparation of an infant formula, comprising:
(a) microfiltering animal skim milk over (i) a ceramic membrane having a porosity of 0.10-0.30 micrometer at a volume concentration factor of 5-7 and temperature between 40° C. and 70° C. or (ii) a spiral wound organic membrane having a porosity of 0.10-0.35 micrometer at a volume concentration factor of 5-7 and temperature between 10 and 25° C. or 40 to 70° C., resulting in a retentate (MFR2) and a permeate (MFP2);
(b) ultrafiltering a liquid composition from the MFP2 over a membrane having a molecular weight cut-off of at most 25 kDa at a volume concentration factor of 4-6, resulting in a retentate (UFR) and a permeate (UFP);
(c) mixing a composition from the MFR2 and the UFR, whereby a composition having a casein/whey weight ratio of 30/70-50/50 is obtained,
wherein the animal skim milk is a permeate (MFP1) from a microfiltration step (MF1) over a membrane having a porosity of 1.0-2.0 micrometer, at a volume concentration factor of 5-20, performed between 10° C. and 70° C., resulting in, a retentate (MFR1) and a permeate (MFP1), wherein the process does not comprise electrodialysis or ion exchange.

2. The process according to claim 1, wherein step (b) is not combined with diafiltration.

3. The process according to claim 1, wherein the composition from the MFR2 and the composition originating from the UFR have, each individually, a water content of at least 60 wt %, based on their respective total weights, prior to step (c).

4. The process according to claim 1, not comprising a spray-drying step prior to step (c).

5. The process according to claim 1, wherein the temperature does not exceed 75° C. prior to step (c).

6. The process according to claim 5, wherein the temperature does not exceed 60° C. prior to step (c).

7. The process according to claim 1, further comprising nanofiltering a liquid composition front the UFR over a membrane having a molecular weight cut-off of at most 500 Da, resulting in a retentate (NFR) comprising whey and a permeate (NFP), wherein a liquid composition originating from the NFR is used in step (c).

8. The process according to claim 1, comprising supplementing the UFR of step (b) with one or more of a fat source, a lactose source and a calcium source.

9. The process according to claim 1, further comprising spray-drying the composition after step (c).

10. The process according to claim 1, wherein:
(a) retentate (MFR2) comprises at most 15 wt % whey protein based on total protein and at least 55 wt % casein based on dry weight of the MFR2, and a permeate (MFP2) comprises at most 1.0 wt % casein based on total dry weight of the MFP2; and
(b) (UFR) comprises 22-33 wt % whey proteins based on total dry weight and a phosphorus/protein weight ratio between 1/40 and 1/100.

11. The process according to claim 1, wherein the liquid composition subjected to ultrafiltering is directly obtained from the MFP2, optionally after concentration and/or supplementation of water or other components.

12. The process according to claim 1, wherein the microfiltering of step (a) is performed at temperature between 10-25° C.

13. The process according to claim 1, wherein the microfiltering of step (a) is performed at temperature between 40-60° C.

14. The process according to claim 1, which does not require supplementation of Na, K, Cl, Mg and P to bring their respective amounts in the infant formula to the following ranges:

| | |
|---|---|
| Na | 120-180 mg/100 g |
| K | 470-700 mg/100 g |
| Cl | 300-450 mg/100 g |
| Mg | 37-55 mg/100 g |
| P | 185-280 mg/100 g. |

15. The process according to claim 14, wherein the infant formula comprises, per 100 g or dry matter: 11.2-12.5 g protein, 48.8-59.6 g lactose, and 27.9-30.8 g fat.

16. The process according, to claim 1, wherein MF1 is over a membrane having a porosity of 1.0-2.0 micrometer, at a volume concentration factor of 8-15, performed between 25° C. and 65° C.

17. The process according to claim 1, which is for humanizing animal milk.

* * * * *